United States Patent Office 3,780,187
Patented Dec. 18, 1973

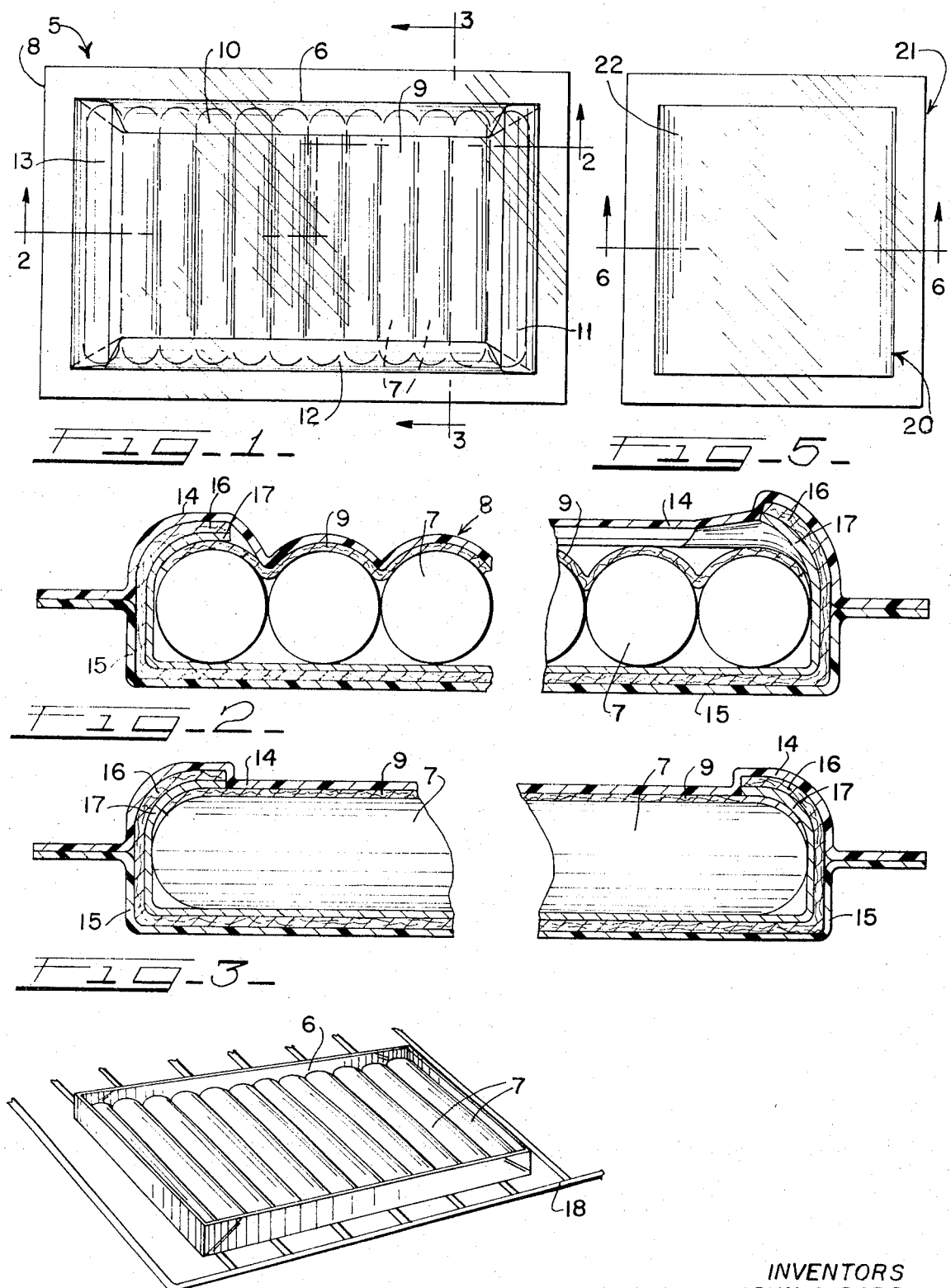

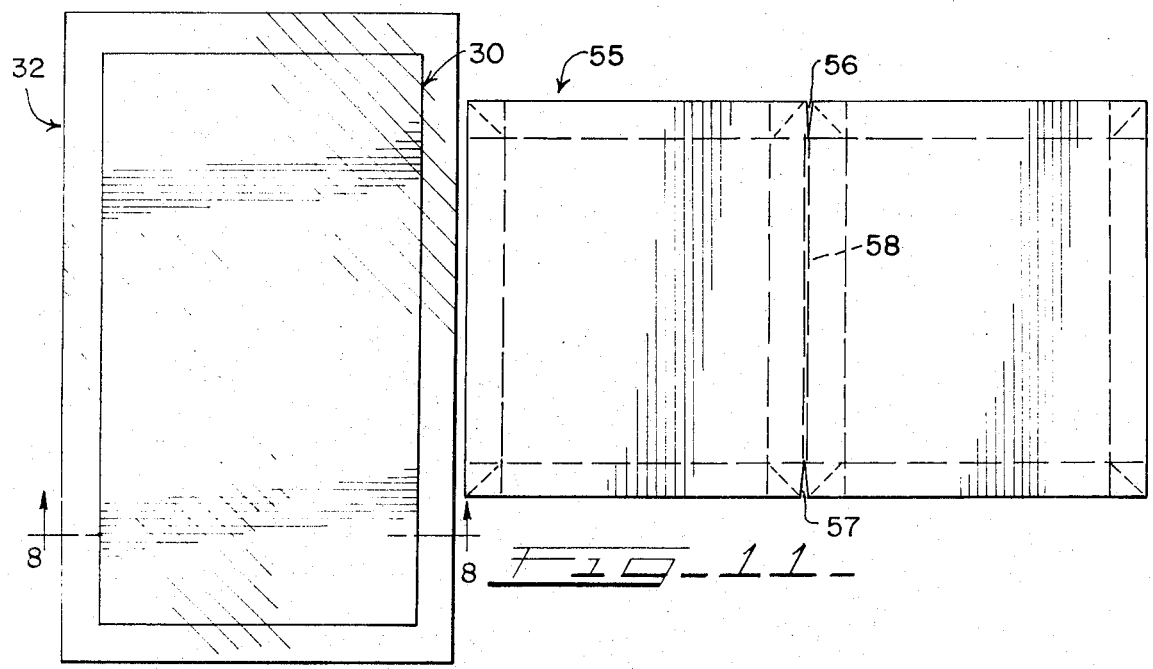
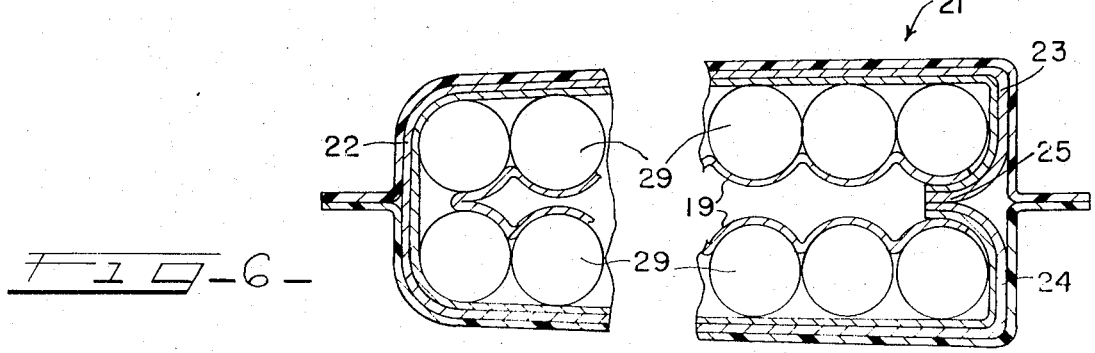
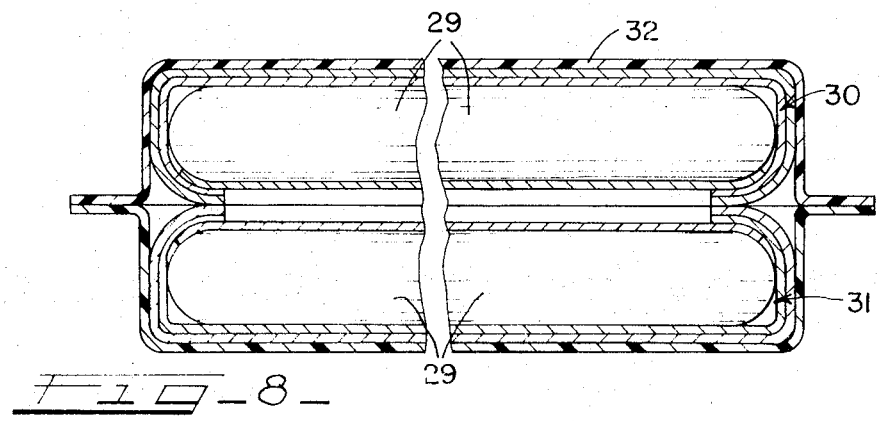

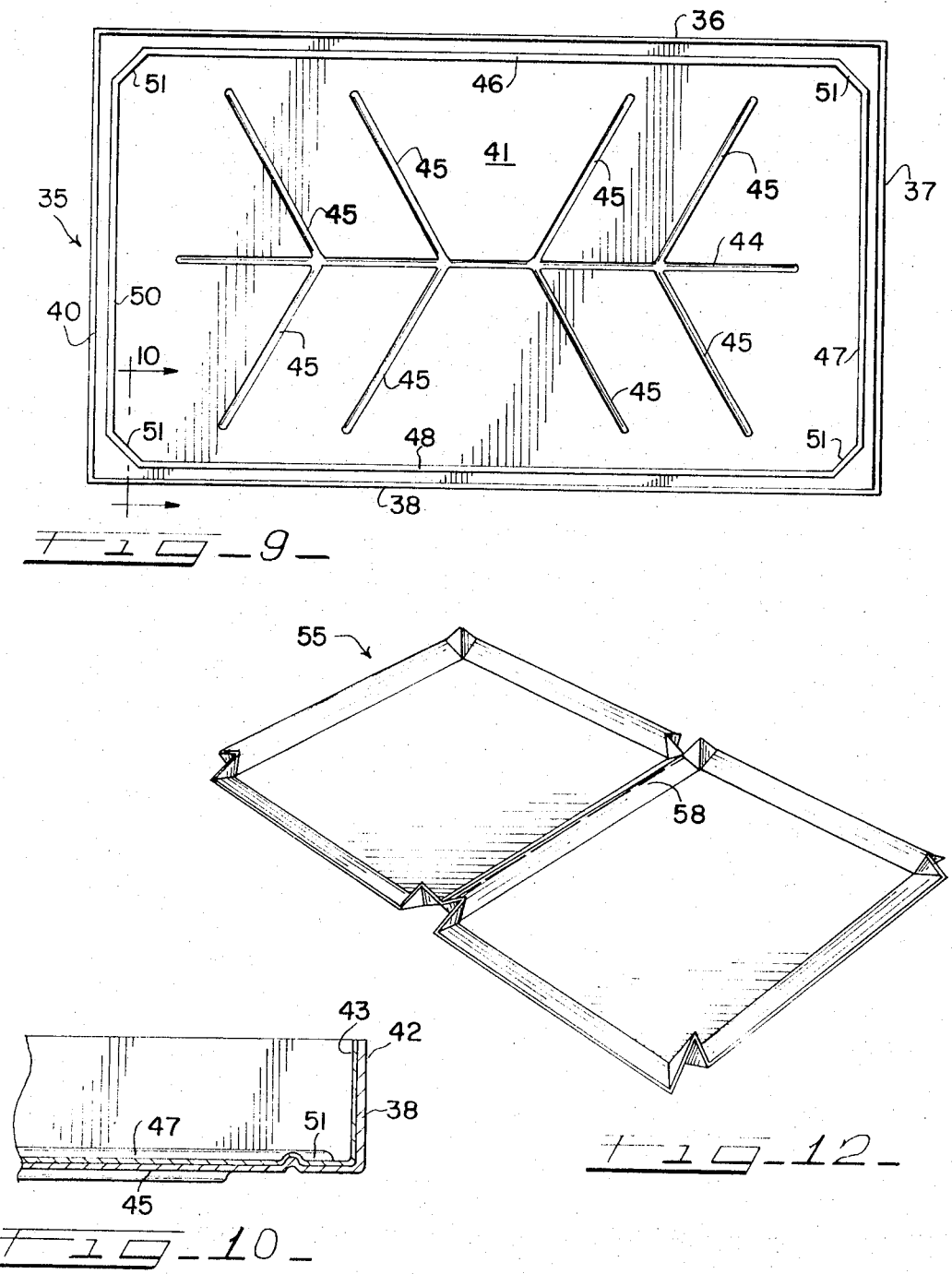

3,780,187
HEAT-AND-SERVE PACKAGES FOR PRECOOKED SAUSAGE AND THE LIKE
John C. Bard and Russell H. Maas, Madison, Wis., assignors to Mayer, Oscar & Company, Inc., Madison, Wis.
Continuation-in-part of application Ser. No. 775,000, Nov. 12, 1968, now Patent No. 3,619,215. This application July 19, 1971, Ser. No. 163,667
The portion of the term of the patent subsequent to Nov. 9, 1988, has been disclaimed
Int. Cl. B65b 25/06
U.S. Cl. 426—113          11 Claims

ABSTRACT OF THE DISCLOSURE

Heat-and-serve packages of precooked sausage and the like include a disposable, heatable tray formed with foldable sides from sheet material capable of retaining melted fat, with links or patties of precooked or prefried sausage or the like laid flatwise on the bottom of the tray. The sides of the tray are folded downwardly and inwardly over the margins of the precooked sausage links or patties and the assembly is enclosed in a disposable film envelope, being preferably evacuated and hermetically sealed. In use, the outer film or envelope is removed, the sides of the tray are folded up and the tray is inserted in an oven, or placed on a hot plate whereby the sausage contents are heated and acquire the characteristic flavor of sausage fried or cooked in the usual manner. Single or multiple trays may be sealed in an envelope formed of barrier film. A single tray may be folded and multiple trays may be separable into smaller trays. While the invention is particularly useful for precooked sausage, other heat-and-serve items that exude or release fat or liquid on heating may constitute the contents.

---

This application is a continuation-in-part of our prior copending application Ser. No. 775,000, filed Nov. 12, 1968, now Pat. No. 3,619,215.

In preparing regular sausage and hamburger patties or links for the table, the housewife, normally heats the meat item in a frying pan during which a considerable amount of fat or greasy liquid, and/or cooking residue accumulates in the pan. This results in a greasy utensil that has to be washed after the grease or other residue has been disposed of in some way. During frying or cooking, sausage produces a characteristic aroma which is highly desirable in itself but apparently required in order to develop the full characteristic flavor of the sausage. Thus, when sausage is cooked in a sealed container, its flavor does not become fully developed.

The object of the present invention, generally stated, is that provision of generally flat, heat-and-serve packages of precooked or prefried sausage links or patties or the like, which include a disposable tray having foldable sides formed from sheet material capable of being heated and retaining melted fat, with the sausage links or patties or other prefried products being laid flatwise on the bottom of the tray, the sides being folded down over the margins of the contents, and the assembly being enclosed within impermeable film and then evacuated and hermetically sealed.

Another object of the invention is the provision of heat-and-serve packages of the class described wherein the outer barrier film envelope fits the trays of precooked or prefried sausage or other similar product sufficiently snugly and tightly so that fat or grease does not migrate to the exteriors of the trays.

Another object of the invention is the provision of packages of precooked sausage and the like of the class and character described wherein the trays are formed of paper broad lined or coated with metal foil and/or other heat and grease resistant material such as films or coatings of polycarbonate resin (General Electric Co., Lexan 144), trimethylpentene (TPX of Imperial Chemical Industries, Ltd.) with a continuous grease retaining dike embossed in the bottom of the tray adjacent the margins, thereby making it unnecessary for the corner seams to be fluid tight with respect to hot grease.

Certain other objects of the invention will in part be obvious, and will in part appear hereinafter.

For a more complete understanding of the nature and scope of the invention, reference may now be had to the following detailed description of several presently preferred embodiments thereof in conjunction with the accompanying drawings wherein:

FIG. 1 is a top plan view of what may be considered as the basic form or embodiment of the invention wherein the precooked contents are sausage links;

FIG. 2 is a magnified sectional view taken on line 2—2 of FIG. 1 with the center portion broken away;

FIG. 3 is a magnified fragmentary sectional view taken on line 3—3 of FIG. 1;

FIG. 4 is a top perspective view showing the disposable tray of the package of FIG. 1 removed from its plastic film envelope and with its sides turned up, the parchment covering sheet removed from the sausage and placed on an oven shelf or grill;

FIG. 5 is a plan view of a second embodiment of the invention wherein a single flat tray of precooked link sausage is folded on itself prior to being packaged in an outer film envelope;

FIG. 6 is a magnified sectional view taken on line 6—6 of FIG. 5 with the center portion broken away;

FIG. 7 is a plan view of a third embodiment of the invention wherein two flat trays filled with prefried link sausage are placed together and sealed in an outer film envelope;

FIG. 8 is a magnified sectional view taken on line 8—8 of FIG. 7 with the center portion broken away;

FIG. 9 is a top plan view of an empty tray formed of foil lined paper board in the opened condition with the foldable sides turned up;

FIG. 10 is a fragmentary sectional view taken on line 10—10 of FIG. 9;

FIG. 11 is a top plan view of a cut and scored tray blank which may be used in connection with still another embodiment of the invention;

FIG. 12 is a perspective view of a blank of FIG. 11 in the partially folded condition;

Figure 15:
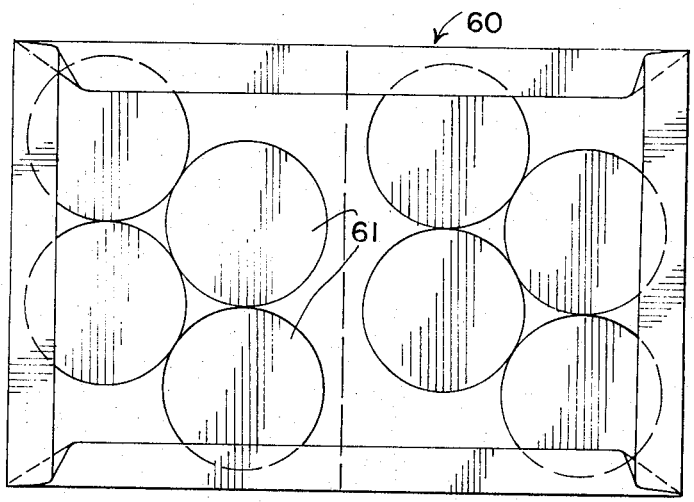
FIG. 15 is a top plan view of a package corresponding to FIG. 1 but wherein the contents are in the form of precooked sausage patties.

Referring to FIGS. 1–4, a heat-and-serve package of prefried sausage is indicated at 5 comprising a heatable disposable tray 6 having links of sausage 7—7 laid flatwise therein and hermetically sealed in an evacuated envelope 8 formed of plastic film having suitable barrier properties with respect to air, moisture and fat penetration.

The disposable tray 6 may be formed of paperboard that is lined with metal foil (e.g. aluminum foil) or it may be formed of sufficiently heavy aluminum sheet, e.g. 0.004 inch thickness. Instead of using metal foil, heat and grease resistant plastic coatings or laminates of known type may be used, such as polycarbonate or trimethylpentene polymers. Such heat and grease resistant sheet materials are commercially available at relatively low cost, and trays may be readily formed therefrom in known manner using known equipment so as to have foldable sides as indicated at 10, 11, 12 and 13 with interconnecting folding corners.

The sausage links 7—7 are laid side-by-side on the bottom of the tray 6 and a grease-resistant covering sheet 9 formed of vegetable parchment or the like is laid over the links. The sides 10 and 12 are then folded down over the ends of the links after which the sides 11 and 13 are folded down as shown. The filled tray 6 with the sides turned down as described is hermetically sealed in an envelope 8 formed of impermeable film after the same has been evacuated.

The envelope 8 may initially be in the form of a bag of suitable size or the envelope may be formed in known manner from two webs of the film having the filled tray 6 inserted therebetween with the films being suitably sealed on all four sides around the tray and the resulting envelope cut out from the webs. Packaging machines have been developed and are currently commercially available capable of high speed evacuation and sealing of plastic envelope type bags, as well as forming envelopes from opposing sheets of film and evacuating and sealing the same.

Various commercial films are available having suitable barrier properties with respect to air, moisture and fat which may be used for forming the envelope 8 including: saran, polyvinyl chloride, Mylar (polyester film), polycarbonate, Pliofilm, and saran coated cellophane. Such films may be used alone or in the form of laminates.

A preferred film material from which the envelope 8 may be formed is a laminate comprising one or more plies of saran. Preferably the envelope 8 is formed from the saran film or laminate while it is in the supercooled amorphous condition wherein it is highly formable and the opposite sides of the envelope 8 conform in close detail to the opposite sides of the filled tray. Pat. 3,083,106 discloses apparatus and method whereby evacuated hermetically sealed packages are formed from opposing laminated films of saran in the supercooled amorphous condition.

In FIG. 2 the upper and lower sheets of the plastic film envelope 8 are indicated at 14 and 15 with the tray 6 being shown formed of sheet material comprising a layer of paper board 16 lined on the interior with aluminum foil 17.

When the envelope 8 is formed from film having the formability of supercooled amorphous saran and the packages are evacuated before being hermetically sealed in known manner as taught for example in Pat. 3,083,106, the envelope 8 will so snugly fit the margins of the sausage filled tray 6 that fat or exudate from the sausage will not wick or migrate between the exterior of the tray 6 and the interior of the envelope 8.

In use, the package 5 of FIGS. 1–4 is opened by cutting or otherwise removing the disposable envelope 8, the tray 6 is removed therefrom and sides 10, 11, 12 and 13 thereof are turned up. The removed tray with its sides turned up may be placed on a wire shelf 18 of a pre-warmed oven as illustrated in FIG. 4. Preferably, the sausage links 7 are prefried to a net weight which ranges from about 50 to 80 percent of the weight of the uncooked or fresh sausage without appreciably shrinking the individual links. By having the sausage prefried there is substantially less residual fat to render during heating and for the tray 6 to hold and the sausage may be prepared in a much shorter time. For example, the final weight of fully-cooked, ready-to-eat sausage runs from about 40 to 70 percent of the weight of the fresh or uncooked sausage. For example, a tray of prefried sausage may be heated adequate in 10 minutes in an oven preheated to 400° F. and the amount of fat that will render will be about 10 to 20 percent of the quantity that renders from uncooked sausage. If the tray of prefried sausage is placed 3 inches under an oven broiler element it will be ready to eat in about 180 seconds. During heating in an oven or on a hot plate, the prefried sausage in the disposable tray 6 will give off the usual aroma or smell and upon eating, the sausage will have the full flavor that characterizes fried sausage. It has been found that if prefried sausage is cooked or heated in completely sealed containers or envelopes the flavor does not become fully developed.

Any tendency for fat or grease from the sausage to wick over the folded down sides of the tray 6 and migrate between the film and the outer surface of the tray is minimized by laying over the sausage in the tray before the sides are folded down, the covering piece of grease absorbent paper (e.g. vegetable parchment) 9 which is removed before the sausage is heated.

Foil-lined or metallized trays with foldable sides such as tray 6 are available commercially which will readily withstand heating to 400° F. in an oven, which is high enough to readily heat the prefried or precooked sausage. Such material will also withstand heating on a hot plate for short periods of time, but long enough to accomplish heating of the prefried sausage in this manner. When the tray is formed of sheet aluminum (e.g. 0.004 inch thickness) it may be heated directly over a gas burner or other flame as well as in the oven or on an electric hot plate.

Referring to FIGS. 5 and 6, a second embodiment of the invention is shown therein wherein a flat tray of precooked linked sausage such as tray 6 in FIG. 1 is folded over on itself and hermetically sealed in an outer film envelope. In FIGS. 5 and 6, such a folded tray filled with precooked sausage is indicated at 20 and the outer film envelope is indicated at 21. The construction of the tray 20, the filling of the same with links of sausage 29, covering with a sheet of parchment 19 and the folding down of the sides may, of course, follow that for tray 6 in FIG. 1. Then such a filled tray is folded over on itself so that the two ends over lay themselves. The folded filled tray is then inserted in the plastic film bag or envelope 21 which may be formed, filled, evacuated and sealed as described in connection with FIG. 1 for the envelope 8. As will be seen from FIG. 6, the fold is on the left hand side or margin of the package as viewed in FIGS. 5 and 6 and is indicated at 22 while the overlying ends are on the right hand margin and indicated at 23 and 24 in FIG. 6.

When the outer envelope 21 is formed from supercooled saran in the amorphous condition, or from a laminate containing supercooled saran, and the packages evacuated and hermetically sealed around the margins, the snugness of the envelope to the folded tray is such that the opposing folded margins such as the one designated at 25 along the right hand vertical edge, will be so tightly held together that wicking or migration of grease or fat onto the outer surfaces of the tray 20 will be prevented even when the pieces of parchment 19 are omitted.

The package of FIGS. 5 and 6 has the advantage that its length is reduced by half the length of the package of FIGS. 1–4, thereby reducing the film requirement for the same package capacity. In addition, the film in the envelope is substantially completely supported in direct contact with the tray thereby offering maximum protection against accidental puncturing in handling. Furthermore, if the film is punctured or torn, the package contents are not directly exposed.

Referring to FIGS. 7 and 8, the embodiment shown therein is formed of two filled trays 30 and 31 laid or superposed face to face (i.e. sausage-to-sausage) and hermetically sealed in an outer envelope plastic film 32. The individual trays 30 and 31 may correspond to the tray 6 in FIGS. 1–4. It will be understood that if it is desired to have maximum exposure of the product then the positions of the filler trays 30 and 31 may be reversed and they may be put back to back and hermetically sealed in the envelope 32. Alternately, the trays 30 and 31 may be superposed so that the sausage is exposed through the film only on one side of the completed package.

When the envelope 32 is formed of supercooled saran, or a laminate containing supercooled saran, it is readily practical to so tightly and snugly compress the margins of the opposed filled trays 30 and 31 that wicking or migrating of the fat or grease from the sausage contents to the exteriors of the trays is prevented.

Referring to FIGS. 9 and 10, an empty tray 35 is shown therein with the sides turned up. The tray 35 is formed of foil lined paperboard and is of the type that may be used as tray 6 in FIGS. 1-4, for example. The sides of the tray 35 are designated at 36, 37, 38 and 40 with the bottom of the tray being designated at 41. In FIG. 10 the paperboard layer is indicated at 42 and the aluminum foil liner is designated at 43.

The bottom 41 of the tray is provided with a longitudinal groove 44 having branch depressions or grooves 45—45 extending at an angle therefrom. The interconnected depressions or grooves 44 and 45 provide channels for melted fat to be distributed in.

Inwardly, from the margins of the bottom 41, it is provided with a grease retaining dike formed by upward scoring or embossing the bottom to provide side and end portions 46, 47, 48 and 50 interconnected by four corner portions 51—51. The resulting grease-retaining dike prevents hot grease or fat from reaching the corners of the tray and thereby eliminates the necessity of the folding corners of the tray being fluid-tight so as to retain the melted grease.

Referring to FIG. 11, a pre-cut and scored tray blank is indicated generally at 55 which may be formed of any one of the heatable grease resistant sheet materials mentioned above. This tray blank 55 may be formed on a quantity production basis by machines of known type so as to have score lines along the margins and in the corners permitting the tray blank to be folded into separate containers as indicated in FIG. 12. In order to facilitate the separation of the tray blank 55 by the customer into two separate trays, two V-cuts 56 and 57 are died out on opposite ends of a line of perforations 58. Whereas, the other score lines indicated in FIG. 11 do no penetrate the sheet material, the line of perforations 58 does involve perforating the sheet material in known manner.

Figure 14:
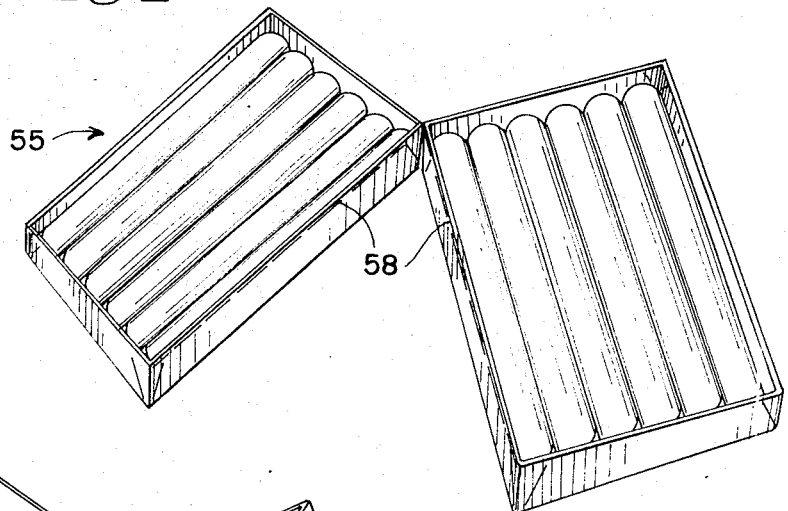
FIG. 14 is a perspective view showing the filled tray of FIG. 13 separated into two halves.
Figure 13:
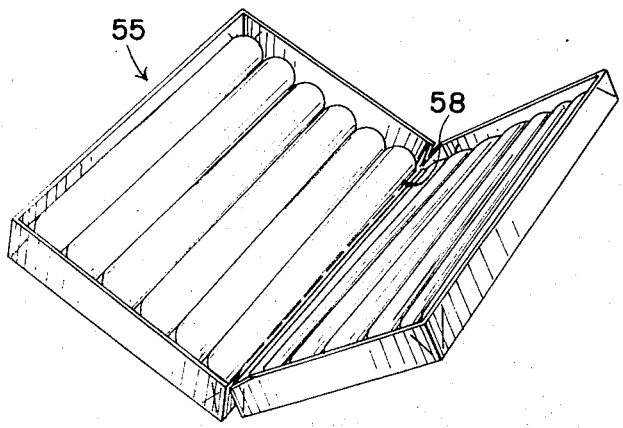
FIG. 13 is a perspective view showing the fully erected tray formed from the blank of FIGS. 11 and 12 filled with links of prefried sausage.

In use, the tray blanks 55 are folded along the score lines so as to form pockets as indicated in FIG. 12 and then the links of sausage or other items are laid in the pockets as indicated in FIG. 13. A piece of grease resistant paper, e.g. vegetable parchment, is then laid over the sausage in one of the halves and the sides and ends of the respective pockets are folded down over the sausage thereby forming a closed package which is hinged at the line of perforations 58. This packet is then enclosed in an outer envelope or bag of film in the manner described above in connection with the embodiments shown in FIGS. 1-8. In use, the consumer opens the outer envelope and removes the inner folded packet and then separates one side or half thereof from the other in the manner illustrated in FIG. 14. The sheet of parchment paper is left in place on the half that is not to be used for the time being. The sides of the half that are to be used are straightened up so as to form a tray and this half with its contents is heated as described above.

In FIG. 15 a package is indicated generally at 60 which corresponds to the embodiment shown in FIGS. 1-4 except that the contents of package 60 are precooked or prefried sausage or hamburger patties 61—61. It will be understood that the capacity of the package 60 could be more efficiently used if the patties 61 were rectangular or square instead of round.

While the present invention is particularly useful and suited for packaging links or patties of precooked or prefried sausage or ground meat such as pork sausage links or hamburger patties, it will be understood that precooked or prefried items that may be laid out in generally flat condition may be packaged.

What is claimed is:

1. A compact generally flat heat-and-serve package of pre-cooked sausage or ground meat in link form comprising a disposable oven-heatable tray formed with foldable sides from sheet material capable of retaining melted fat and greasy liquid, precooked sausage or ground meat in link form laid in a single layer side by side over the bottom of said tray with the sides thereof folded inwardly and downwardly over the margins of said contents, and disposable film having air, moisture and grease barrier properties enclosing at least the top side of said tray, said sides being erectable on removal of said film to form a continous upstanding sidewall around said tray bottom.

2. The heat-and-serve package of claim 1 wherein said disposable film is in the form of an envelope completely enclosing said tray and contents.

3. The heat-and-serve package of claim 1 wherein said package is evacuated and hermetically sealed.

4. The heat-and-serve package of claim 1 wherein said disposable film comprises saran applied in the supercooled condition.

5. The heat-and-serve package of claim 1 wherein said tray with contents therein is doubled over on itself and evacuated and hermetically sealed in an envelope formed of said disposable film.

6. The heat-and-serve package of claim 1 wherein said tray is formed of paperboard to which aluminum foil is laminated on the interior.

7. The heat-and-serve package of claim 1 wherein the bottom of said tray is scored to provide a continuous dike inwardly spaced from the margins of the bottom.

8. The heat-and-serve package of claim 1 wherein said tray is formed of aluminum foil.

9. The heat-and-serve package of claim 1 wherein the interior surface of said tray is formed of heat and grease resistant plastic.

10. The heat-and-serve package of claim 1 wherein said tray is separable into a plurality of smaller trays with foldable sides.

11. The heat-and-serve package of claim 1 wherein at least two of said filled trays are superposed and said removable film is in the form of an evacuated and hermetically sealed envelope.

References Cited
UNITED STATES PATENTS

| | | | |
|---|---|---|---|
| 2,609,301 | 9/1952 | Lindsey | 99—171 N |
| 3,012,894 | 12/1961 | Nagel | 99—171 N X |
| 3,190,759 | 6/1965 | Stryk | 99—171 N |
| 3,407,077 | 10/1968 | Nelin | 99—171 N |
| 3,619,215 | 11/1971 | Bard et al. | 99—174 |

ROBERT HALPER, Primary Examiner

U.S. Cl. X.R.

206—96 F; 426—119, 129